United States Patent [19]

Egawa

[11] Patent Number: 4,885,754
[45] Date of Patent: Dec. 5, 1989

[54] HIGH FREQUENCY DISCHARGE EXCITATION LASER DEVICE

[75] Inventor: Akira Egawa, Yamanashi, Japan

[73] Assignee: Fanuc Ltd., Yamanashi, Japan

[21] Appl. No.: 243,566

[22] PCT Filed: Dec. 22, 1987

[86] PCT No.: PCT/JP87/01012
§ 371 Date: Aug. 18, 1988
§ 102(e) Date: Aug. 18, 1988

[87] PCT Pub. No.: WO88/04844
PCT Pub. Date: Jun. 30, 1988

[30] Foreign Application Priority Data

Dec. 23, 1986 [JP] Japan ................... 61-305533

[51] Int. Cl.$^4$ ........................... H01S 3/097
[52] U.S. Cl. ......................... 372/86; 372/88; 372/61
[58] Field of Search ............ 372/87, 86, 82, 88

[56] References Cited

U.S. PATENT DOCUMENTS

| 3,614,653 | 10/1971 | Javan et al. | 372/82 |
| 4,509,176 | 4/1985 | Marchetti et al. | 372/82 |
| 4,593,397 | 6/1986 | Proud et al. | 372/87 |
| 4,596,018 | 6/1986 | Geuber et al. | 372/82 |
| 4,597,086 | 6/1986 | Kimbara | 372/82 |

OTHER PUBLICATIONS

Crockel et al.; Carbon-Dioxide Laser with Power Per Unit Length, Elect. Lett., vol. 5, No. 4, Feb. 20, 1969.

Primary Examiner—Leon Scott, Jr.
Attorney, Agent, or Firm—Armstrong, Nikaido, Marmelstein, Kubovcik & Murray

[57] ABSTRACT

In a high frequency discharge excitation laser device, an auxiliary electrode (3) is arranged close to main electrodes (21), (22), an auxiliary discharge is generated between the main and auxiliary electrodes in addition to a main discharge between the main electrodes, and a high frequency discharge is maintained, and accordingly, a laser light oscillation is maintained even in a low power state, so that a high precision machining becomes possible.

7 Claims, 8 Drawing Sheets

HIGH FREQUENCY DISCHARGE EXCITATION LASER DEVICE

TECHNICAL FIELD

The present invention relates to a high frequency discharge excitation laser device. The device according to the present invention is used, for example, when a laser light is generated for a precise machining of a workpiece.

BACKGROUND ART

Figure 13:
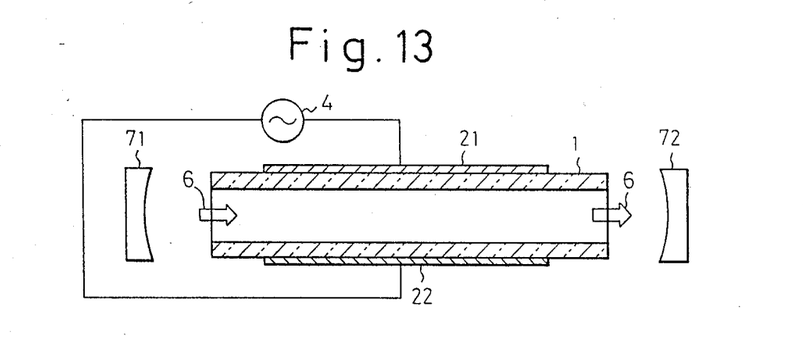
Figure 14:
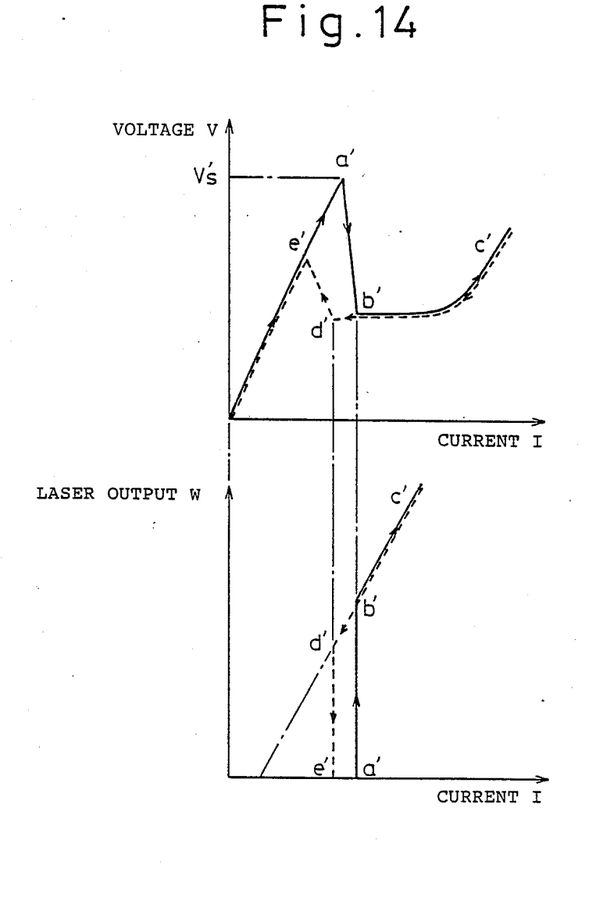

In general, a laser device for generating a laser light for precise machining has a structure, such as shown in FIG. 13, which includes a discharge tube 1, electrodes 21 and 22, a high frequency power source circuit 4, a total reflection mirror 71, and a half-mirror 72. A high frequency discharge is generated in a gas 6, such as He, Ne, $CO_2$ and the like, flowing through a discharge tube 1, and accordingly, a laser light oscillation is generated. The characteristics of the voltage between electrodes $V_1$ and the laser output W, with regard to the electric current I between electrodes, are shown in FIG. 14. Namely, in accordance with an increase of the current I, the voltage rises from 0 to a point a' corresponding to the discharge starting voltage $V_s'$ passing through a point e'. Then, when the discharge is started, the voltage suddenly drops to a point b', and subsequently changes along a curve b'-c'. Following the decrease of the current I, the voltage changes along a curve c'-b', passing through point b', and when the voltage reaches point a', rises suddenly to point e' and then falls to point 0.

In correspondence with this change of the voltage V, the characteristics of the laser output W as shown in the lower side of FIG. 14 are obtained. As shown in this characteristic curve of the laser output W, during the reduction of the current I, the laser output becomes extinct at a point d'. Namely, in the characteristic curve of the laser output W, within the range between points d' and e', the laser output can not be controlled by the current I. Therefore, a problem arises in that it is very difficult to obtain a stable control of a laser output when the laser output is low, and thus it is impossible to meet the requirements for a precise machining operation.

DISCLOSURE OF THE INVENTION

An object of the present invention is to provide an improved high frequency discharge excitation laser device in which the above-described problems of the prior art are solved.

In accordance with the present invention, there is provided a high frequency discharge excitation laser device comprising, a discharge tube made of a dielectric material for generating a discharge for laser light oscillation in a gas flowing therethrough; a plurality of main electrodes arranged on the external surface of the discharge tube; and a power source circuit for supplying a high frequency voltage between the main electrodes to generate a laser light oscillation discharge in the discharge tube; characterized in that the laser device further comprises an auxiliary electrode arranged close to the main electrodes on the external surface of the discharge tube, wherein an auxiliary discharge can be generated between the main electrodes and the auxiliary electrode in addition to a main discharge between the main electrodes.

BEST MODE OF CARRYING OUT THE INVENTION

Figure 1:
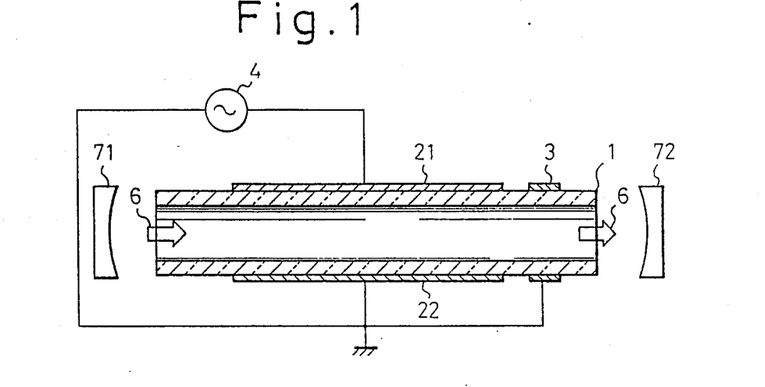
FIG. 1 shows a structure of a high frequency discharge excitation laser device as an embodiment of the present invention.
Figure 2:
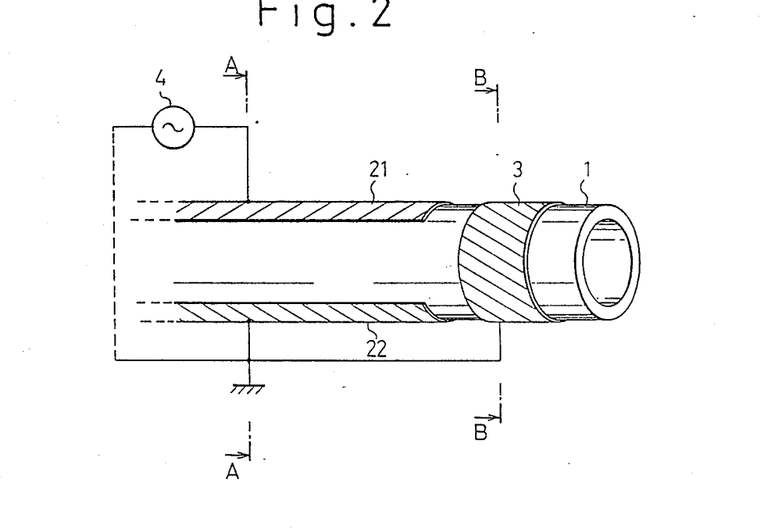
FIG. 2 is a perspective view showing a portion of the device of FIG. 1.
Figure 3:
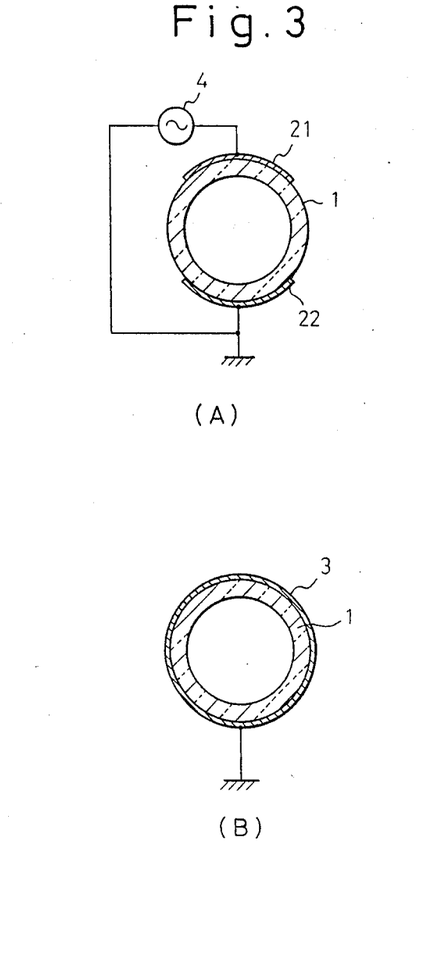
FIGS. 3(A) and 3(B) are cross-sectional views showing cross-sections of the device of FIG. 1.

The structure of a high frequency discharge excitation laser device according to an embodiment of the present invention is shown in FIG. 1, a perspective view of a portion of the device of FIG. 1 is shown in FIG. 2, and a cross-section of a discharge tube of the device of FIG. 1 is shown in FIGS. 3(A) and 3(B).

As shown in FIG. 1, the high frequency discharge excitation laser device is made of a dielectric material such as glass, ceramic, and the like, and is provided with a cylindrical discharge tube 1 for generating a discharge for laser light oscillation in a gas 6 such as He, Ne, $CO_2$, and the like, flowing through the inside of the discharge tube 1, a plurality of main electrodes 21, 22 arranged on the external peripheral surface of the discharge tube, and a power source circuit 4 for supplying a high frequency voltage between the main electrodes 21 and 22 to generate a laser light oscillation discharge in the discharge tube. Further, a total reflection mirror 71 and a half-mirror 72 for laser light are incorporated in the device. The voltage and the frequency to be supplied between the main electrodes can be selected and determined from among various values but, for example, a voltage of from 1 kV to 3 kV and a frequency of from 1 MHz to 10 MHz are used in practice.

As shown in FIG. 1, the high frequency discharge excitation laser device is provided with an auxiliary electrode 3 arranged close to the main electrodes on the external surface of the discharge tube, and accordingly an auxiliary discharge can be generated between the main electrode 21 and the auxiliary electrode 3, in addition to a main discharge generated between the main electrodes 21 and 22. This auxiliary discharge may be generated to maintain the high frequency discharge in the discharge tube when the high frequency voltage is supplied in the low power state. Preferably, the distance between the main electrode and the auxiliary electrode is less than the distance between the main electrodes.

Figure 4:
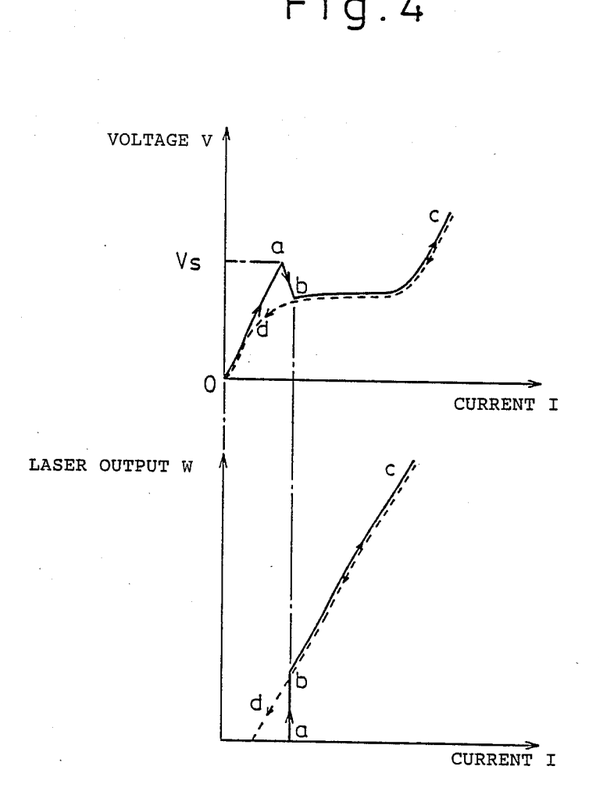
FIG. 4 illustrates the characteristics of the voltage and the laser output in a high frequency discharge by the device in FIG. 1.

In the high frequency discharge excitation laser device of FIG. 1, the characteristics of the voltage V with regard to the current I, and the characteristics of the laser output W with regard to the current I, are illustrated in FIG. 4. The current rises linearly from 0 toward a point "a" which corresponds to the discharge starting voltage $V_s$. The discharge is started at point "a", and the voltage falls sharply to a point "b", and then the current increases along a curve b-c. If the current is decreased from a point "c", the voltage moves along the curve c–b, and even when passing through point "b", does not exhibit a jumping phenomenon, and then falls slowly to a point "0". This change from point "b" to point "0" via a point "d" during the voltage decreasing process indicates that the high frequency discharge is maintained at a low power state in the discharge tube.

The characteristics of the laser output W with regard to the current I are shown in the lower portion of FIG. 4. When the current is increased from 0, the laser output rises steeply from a point "a" on the X-axis to a point "b", which corresponds to a predetermined voltage value, to start the laser light oscillation, and due to the increase in the current, the laser output also increases along the curve b–c. But, when the current is decreased along the curve b–c, the laser output is also decreased, and even after passing through point "b", the laser output does not fall suddenly to 0 but is made to gradually fall, in accordance with the reduction in the current, to 0 along the curve d. This change from point "b" to the value 0 via point d, during the laser output decrease, indicates that the laser light emission remains at the low power state.

Figure 5:
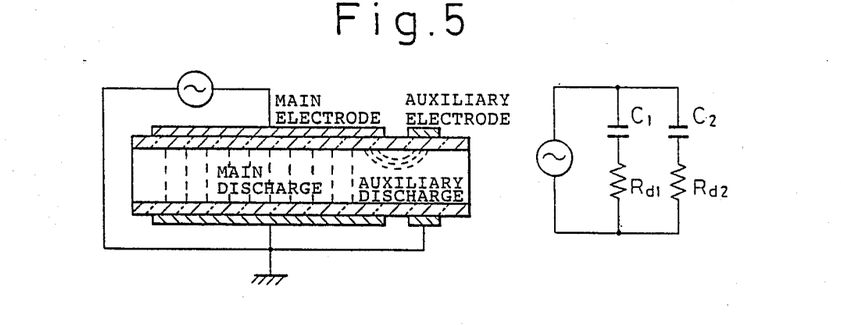
FIG. 5 illustrates an analysis of the discharge characteristics of the device of FIG. 1.
Figure 15:
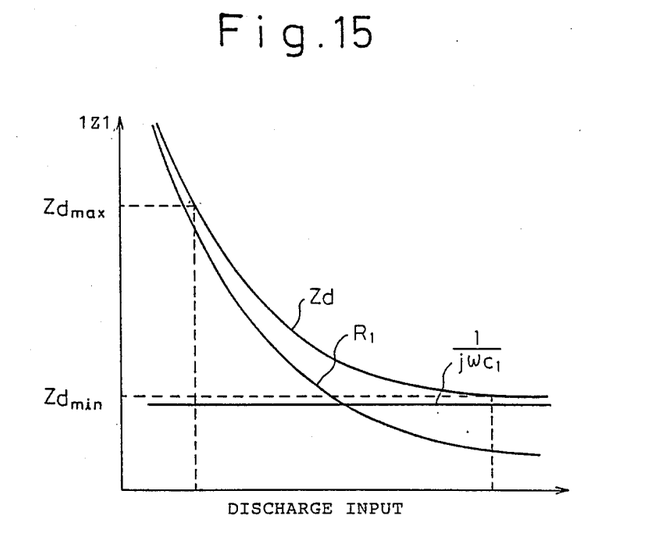
FIGS. 15 and 16 illustrate the discharge characteristics of the device of FIG. 1.
Figure 16:
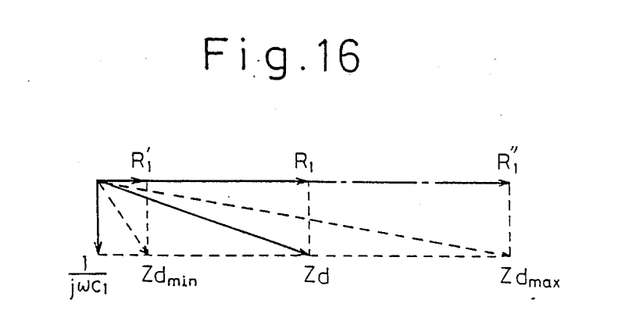

The reasons why the characteristics of the voltage and laser output from a high frequency discharge, as shown in FIG. 4, in the device of FIG. 1, are obtained, will be investigated with reference to FIGS. 5, 15, and 16. The device of FIG. 1 can be considered, as an electric circuit, to be an electric power transmission circuit for transmitting power from a high frequency power source through a matching circuit to a discharge load, although a matching circuit, not shown in FIG. 1, a $\pi$ circuit having an inductance located in series and 2 capacitances connected in parallel between each end of the inductance and the ground, is generally used. The impedance $Z_d$ of the discharge loading is represented by the following:

$$\frac{1}{j\omega C_1} + R_{d1}$$

where, $C_1$ is a capacitance as an impedance of the discharge tube, and $R_{dl}$ is a resistance of the discharge path. The impedance of a power source is represented by $Z_0$. The condition for matching is that the impedance of the power source is equal to the conjugate value of the impedance $R_{dl}$ of the discharge loading.

If an auxiliary electrode is not incorporated, and only a main discharge is generated, it is difficult to maintain a matching condition covering a wide range of discharge input i.e., laser output value, and further, it is difficult to adequately transmit power from the power source to the discharge loading because, under a constant voltage, if the discharge input is reduced by reducing the current, the resistance $R_{dl}$ is increased, and thus the discharge loading impedance is increased so that it is difficult to maintain the matching condition and, therefore, a mismatched state exists which may disturb the transmission of power to the discharge loading. As a result, this insufficient transmission of power to the discharge loading causes a phenomenon in which the discharge abruptly becomes extinguished.

To prevent this phenomenon and ensure a delivery of sufficient power to the discharge loading, the impedance of the discharge loading must be discharged. A method of reducing the impedance of the discharge loading is to lower the total impedance by providing an auxiliary discharge load $Z_d$ in parallel with the main discharge load $Z_d$, which can be realized by providing an auxiliary electrode. The discharge loading generated by the auxiliary electrode is represented, in an equivalent circuit shown in the right side of FIG. 5, by a series circuit including the discharge tube capacitance $C_2$ and the auxiliary discharge path resistance $R_{d2}$. The impedance $Z_d'$ of auxiliary discharge loading is represented by the following:

$$\frac{1}{j\omega C_2} + R_{d2}$$

In this case, the auxiliary discharge impedance $Z_d'$ requires the following characteristics. Namely, assuming the parallel composite impedance of $Z_d$ and $Z_d'$ is $Z_{dp}$, (1) when the discharge input is high, and the main discharge impedance $Z_d$ matches the power source, to ensure that the auxiliary discharge impedance $Z_d'$ is an appropriately large value having no effect on the value of $Z_d'$, the following is required:

$$Z_{dp} = \frac{Z_{d\,min} \cdot Z_d'}{Z_{d\,min} + Z_d'} = Z_{d\,min} \quad (1)$$

and consequently, the following is required:

$$Z_d'/Z_d min >> 1 \ldots \quad (2)$$

(2) when the discharge input is small, and the main discharge impedance $Z_d$ does not match the power source, the main discharge becomes extinguished, and $Z_d$ is increased to a large value, leading to the following:

$$Z_{dp} = \frac{Z_d \cdot Z_d'}{Z_d + Z_d'} = Z_d' \quad (3)$$

In this case, the match with the power source should be maintained only by $Z_d'$, and therefore, the following is required:

$$Z_d'/Z_{d\,max} \leq 1 \ldots \quad (4)$$

where, $Z_{d\,min}$ is the minimum main discharge impedance value when the main discharge and the power source match, and $Z_{d\,max}$ is the maximum main discharge impedance value when the main discharge and the power source match.

The above described changes of the discharge impedance with regard to the discharge input are shown in FIGS. 15 and 16. In FIG. 15, the abscissa represents the discharge input, and the ordinate represents the absolute value of the impedance Z.

Based on the above, the following conditions can be calculated with regard to the auxiliary discharge impedance $Z_d'$.

In the above-mentioned case (1);

$$Z_{d\,min} = R_1 + \frac{1}{j\omega C_1} = \frac{1}{j\omega C_1} \quad (5)$$

$$Z_d' = R_2 + \frac{1}{j\omega C_2} = \frac{1}{j\omega C_2} \quad (6)$$

Therefore, the following is derived:

$$Z_d'/Z_{d\,min} = C_1/C_2 \gg 1 \ldots \quad (7)$$

In the above-mentioned case (2):

$$Z_{d\,max} = R_1 + \frac{1}{j\omega C_1} = R_1 \quad (8)$$

$$Z_d' = R_2 + \frac{1}{j\omega C_2} \quad (9)$$

Therefore, the following is derived;

$$Z_d'/Z_{d\,max} = R_2 + \frac{1}{j\omega C_2}/R_1 \leqq 1 \quad (10)$$

Figure 6:
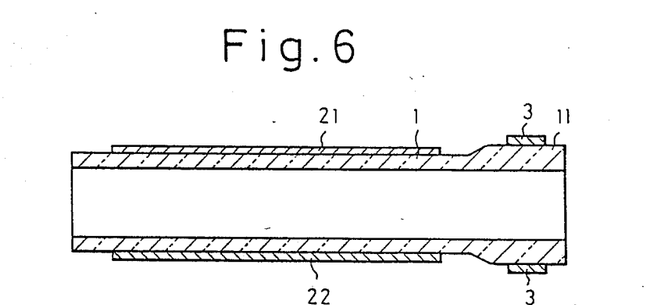
FIGS. 6 through 14 show various modified embodiments of the present invention.
Figure 7:
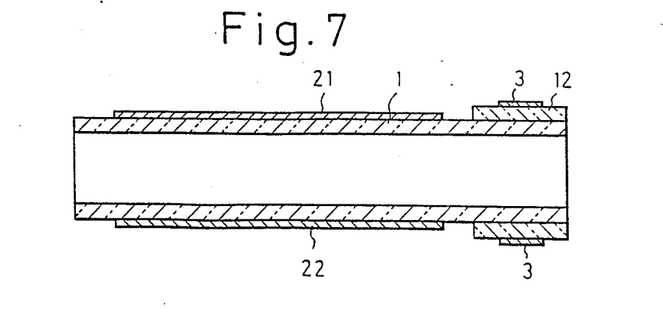

Accordingly, by formula (7) above, conceivably, as a means of reducing the capacitance $C_2$ of the auxiliary discharge electrode portion, the thickness of the portion of the wall of the discharge tube 1 whereat the auxiliary electrode 3 is arranged, can be made greater than the thickness of the portion of the wall of the discharge tube 1 whereat the main electrodes 21, 22 are arranged, as shown in FIGS. 6 and 7. FIG. 6 shows the increased thickness realized by the expansion of the wall of the discharge tube, and FIG. 7 illustrates the increased thickness realized by applying a dielectric material to the wall of the discharge tube.

Figure 8:
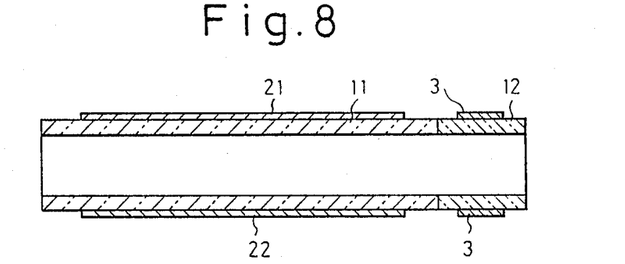

Also, it is considered that the selection of materials can be carried out in such a manner that the dielectric constant of the portion of the dielectric material of the discharge tube where the auxiliary electrode is arranged is less than that of the portion of the dielectric material of the discharge tube where the main electrodes are arranged, as shown in FIG. 8.

Next, to satisfy the formula (10), $R_2$ should be as small as possible, and accordingly, as previously described, the distance between the main electrodes and the auxiliary electrode should be made less than the distance between the main electrodes.

Nevertheless, when the distance between the main electrodes and the auxiliary electrode is too small, a problem arises in that an electrical breakdown will occur on the external wall surface of the discharge tube.

Figure 9:
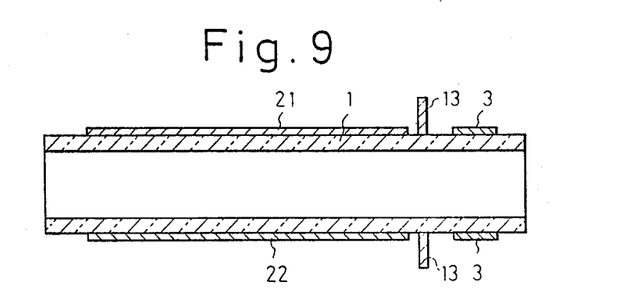

To counter this problem, a barrier body 13 should be arranged between the auxiliary electrode and the main electrodes, as shown in FIG. 9.

By adopting this form, in which an appropriate impedance $Z_d'$ of the auxiliary discharge load is connected in parallel, the resultant impedance becomes appropriate, the discharge is maintained over a wide range, and accordingly, the discharge in the discharge tube can be stably maintained even at a low power state.

The above has been clarified for the first time by the results of studies of high frequency discharge characteristics carried out by the present inventor, and the present invention has been created on the basis of these results.

In an implementation of the present invention, various modified embodiments other than those described above are possible. For example, instead of locating the auxiliary electrode 3 downstream, with regard to the gas flow 6, of the main electrodes 21 and 22, it is possible to locate it upstream of the main electrodes 21 and 22.

Also, the thickness of the portion of the wall of the discharge tube 1 whereat the auxiliary electrode 3 is arranged may be made greater, as shown in FIGS. 6 and 7, than the thickness of the portion of wall of the discharge tube whereat the main electrodes are arranged. FIG. 6 shows an increased thickness realized by the partial expansion of the wall, and FIG. 7 indicates an increased thickness realized by applying a dielectric material to the wall.

Also, the material may be selected so that the dielectric constant of the portion of the dielectric material of the discharge tube whereat the auxiliary electrode is arranged is less than the dielectric constant of the portion of the dielectric material of the discharge tube whereat the main electrodes are arranged, as shown in FIG. 8.

Also, a barrier body may be arranged between the auxiliary electrode and the main electrodes, as shown in FIG. 9.

Figure 10:
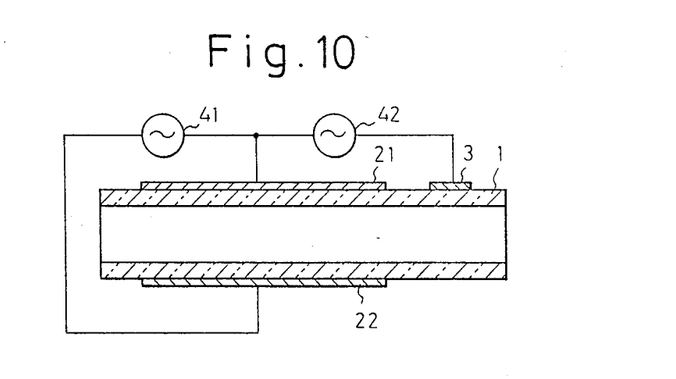
Figure 11:
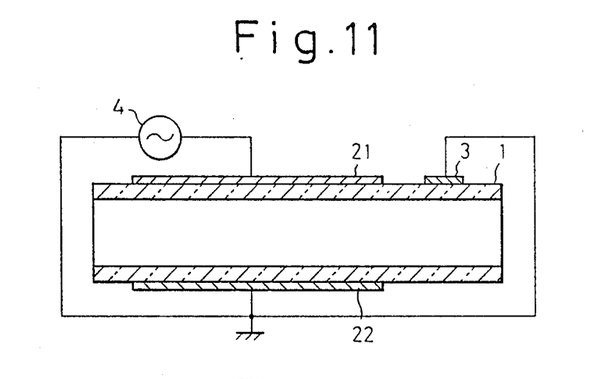
Figure 12:
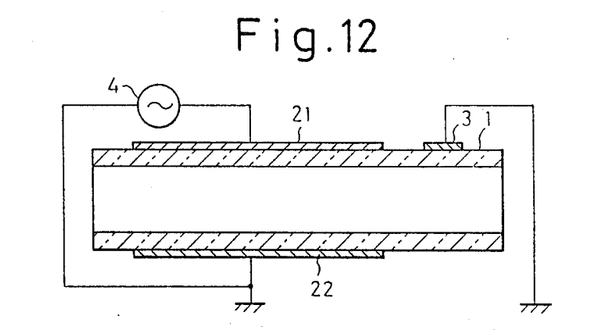

Further, instead of the wiring connection shown in FIG. 1 for the auxiliary electrode and main electrode various types of wiring connections, as shown in FIGS. 10, 11, and 12, may be used. In the case of the modified embodiments shown in FIGS. 10, 11, and 12, the auxiliary electrode is not completely but only partially arranged on the periphery of the portion of the discharge tube.

In the above-described embodiments of the present invention, an auxiliary discharge is generated between the main electrodes and the auxiliary electrode in addition to a main discharge between the main electrodes, a high frequency discharge is maintained even under low power conditions, and a laser light oscillation can be maintained. Therefore, the range of the laser light output is expanded, and in particular, when a precise machining is carried out by the laser light output, a stabilized high precision machining becomes possible, and accordingly, an extremely useful high frequency discharge excitation laser device for precision machining is realized.

I claim:

1. A high frequency discharge excitation laser device, comprising:
 a discharge tube made of dielectric material for generating a discharge for laser light oscillation in an active laser gas flowing therethrough;
 a plurality of main electrodes disposed on an external surface of said discharge tube;
 a power source circuit for supplying a high frequency voltage between said main electrodes to generate a laser light oscillation discharge in said discharge tube; and
 an auxiliary electrode disposed on the external surface of said discharge tube wherein a distance between said main electrodes and said auxiliary electrode is less than a distance between said main electrodes, such that an auxiliary discharge is generated between said main electrodes and said auxiliary electrode in addition to a main discharge between said main electrodes.

2. A device according to claim 1, wherein said auxiliary electrode is located downstream of said main electrodes with regard to said flow of gas.

3. A device according to claim 1, wherein said auxiliary electrode is located upstream of said main electrodes with regard to said flow of gas.

4. A device according to claim 1, wherein a thickness of a portion of a wall of said discharge tube whereat said auxiliary electrode is disposed is greater than a thickness of a portion of a wall of said discharge tube whereat said main electrodes are disposed.

5. A device according to claim 1, wherein a dielectric constant of a portion of the dielectric material of said discharge tube whereat said auxiliary electrode is disposed is less than a dielectric constant of a portion of the dielectric material of said discharge tube whereat said main electrodes are disposed.

6. A device according to claim 1, wherein a barrier is disposed on the external surface of said discharge tube between said auxiliary electrode and said main electrodes.

7. A device according to claim 1, wherein said auxiliary electrode is electrically connected to one of said main electrodes and is disposed nearer to the other of said main electrodes.

* * * * *